United States Patent Office 3,806,509
Patented Apr. 23, 1974

3,806,509
6-ACYLAMINOPHENYL-4,5-DIHYDRO-PYRIDAZONES
Rolf Lebkuecher, Horst Koenig, and August Amann, Ludwigshafen, Hubert Giertz, Limburgerhof, and Joerg Schuster, Viernheim, Germany, assignors to Badische Anilin- & Soda-Fabrik Aktiengesellschaft, Ludwigshafen (Rhine), Germany
No Drawing. Filed May 8, 1972, Ser. No. 251,365
Claims priority, application Germany, May 11, 1971, P 21 23 246.2
Int. Cl. C07d 51/04
U.S. Cl. 260—250 A                          6 Claims

ABSTRACT OF THE DISCLOSURE

New 6-acylaminophenyl-4,5-dihydropyridazones bearing a substituent in the acyl radical, methods for their production and their use as medicaments, which have the effect of lowering blood pressure, dilating the coronary arteries and combatting inflammation.

---

The invention relates to new 6-acylaminophenyl-4,5-dihydropyridazones bearing a substituent in the acyl radical and having the General Formula 1, to their acid addition salts and to methods for their production:

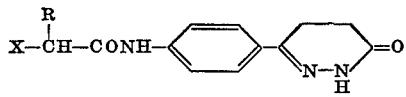
(1)

The individual radicals in the formula have the following meanings:

R—hydrogen or lower alkyl
X—(a) alkylamino, (b) arylamino, (c) dialkylamino, (d) alkylarylamino, (e) trialkylamino and the last-mentioned compounds may be present as quaternary ammonium compounds with an appropriate anion as the counteranion.

The alkyl in amino groups (a) to (e) may contain double bonds or triple bonds. These unsaturated or saturated alkyls may bear halogen, hydroxy, alkoxy, alkylamino, dialkylamino, carboxy, carbalkoxy or phenyl as substituents. Two alkyls attached to one nitrogen may also form together therewith and if desired with the participation of other heteroatoms such as oxygen, nitrogen or sulfur, a heterocyclic ring, for example pyrrolidone, piperidine, piperazine, N-methylpiperazine, morpholine or hexamethylenimine, the heterocycle may also bear substituents as described above. The phenyl in the amino groups (a) to (e) may also bear alkyl, halogen, trifluoromethyl, hydroxy, alkoxy, amino, alkylamino, dialkylamino, carboxy and carbalkoxy as substituents in ortho, meta or para position. In the context of the present invention alkyls in the amino groups (a) to (e) include cycloalkyls, particularly those having five to seven ring members. The cycloalkyl radicals may also bear endo-bridges.

R is preferably hydrogen.

Lower alkyl for R means one to about eight, preferably up to four, carbon atoms, among these methyl and ethyl are particularly preferred for R.

Alkyls in the alkylamino X preferably contain one to six carbon atoms. If the alkyl bears phenyl as a substituent, alkyls of one to three carbon atoms are preferred. If the phenyl radical in the phenyl-substituted alkylamino X or in the arylamino X bears substituents, these are preferably one or two methyl groups, fluorine or trifluoromethyl.

Preferred substituents in the alkylamino X (instead of phenyl) are radicals containing oxygen, particularly hydroxyl.

The new compounds may be obtained by the following methods:

Reaction of a dihydropyridazone of the General Formula 2:

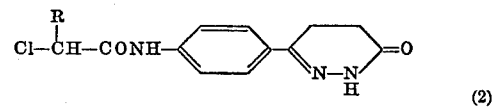
(2)

in which R has the meanings given above by a known method with an amine of the Formula 3, $$X'  \quad\quad\quad (3)$$

where X' is XH or trialkylamine, X having the meanings given in Formula 1.

For the production of starting Compounds 2, compounds of Formula 4 may be reacted with compounds of Formula 5 to form compounds of Formula 6:

(4)

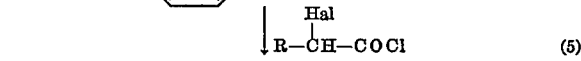
(5)

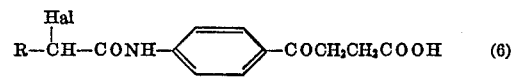
(6)

where Hal is halogen, and Compounds 6 obtained cyclized with hydrazine to form compounds of Formula 2 which are then further reacted as described to form the compounds according to the invention.

The compounds of Formula 2 used as starting materials may also be obtained by reaction of a compound of Formula 8:

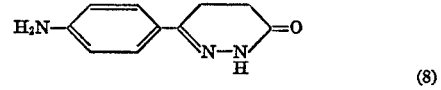
(8)

with an α-halocarboxylchloride of Formula 5:

(6)

in which R has the above meanings by a known method.
The starting compounds of Formula 8 may be obtained by reacting by a known method a compound of Formula 9:

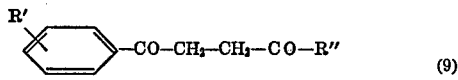
(9)

in which R' is NH₂ or a radical convertible into NH₂ and R" is hydroxyl or alkoxy, with hydrazine and converting R' into R.

Starting from Compound 6 another method for the production of the dihydroxypyridazones according to the invention consists in reacting a compound of the Formula 6 with an amine of Formula 3 to form a compound of Formula 7 which is then cyclized with hydrazine to form a compound of Formula 1:

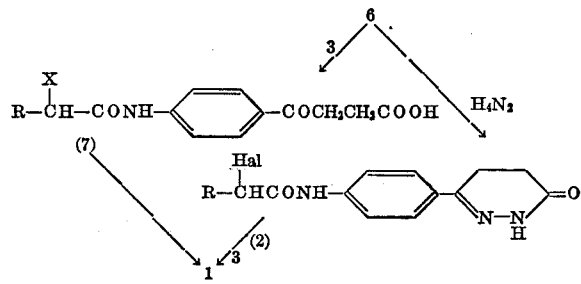

In this variant of the process it is not necessary to isolate Compound 7 but after the chlorine atom in Compound 6 has been replaced by an amino radical the amount of hydrazine required for cyclization into the dihydropyridazone may be added.

The reactions of Compounds 2 with 3 are carried out in the presence of an agent for binding hydrogen halide. It is advantageous to use an inert organic solvent at a temperature from 50° to 150° C. The agent for binding hydrogen halide may be an inorganic or organic tertiary base, but an at least molar excess of the corresponding amine of Formula 3 is suitable and this may serve as a solvent at the same time. The compound of Formula 2 may contain one mole of HCl added to it. In this case it is rational to use at least one further mole of the agent binding hydrogen halide.

Reactions of Compounds 6 with 3 are carried out in the presence of an agent for binding hydrogen halide. It is preferred to use a solvent, preferably water or a lower alcohol such as methanol, ethanol, propanol, isopropanol or butanol, at a temperature of from 50° to 150° C. An inorganic or organic tertiary base may be used as the agent for binding hydrogen halide. An at least molar excess of the appropriate amine of the Formula 3 may however be used and this serves as a solvent at the same time. The Compounds 7 formed may remain in the reaction solution, without being isolated, and cyclization may be carried out by adding hydrazine and boiling under reflux to form the dihydropyridazone compound.

The compounds of the Formula 1 may if desired be converted by known methods with physiologically compatible inorganic or organic acids into their acid addition salts which have the advantage of a better solubility. Examples of such acids are hydrochloric, sulfuric, phosphoric, acetic, citric, tartaric, maleic, fumaric and malic acids.

The compounds of this invention have valuable pharmaceutical properties. In particular they have the effect of lowering blood pressure, dilating the coronary arteries and combating inflammation.

Among the compounds found to be effective on the heart and circulation those may be emphasized in which R is hydrogen and in which X is alkylamino, aralkylamino or dialkylamino.

Preferred alkylamino compounds are linear or branched, saturated or unsaturated aliphatic radicals of two to six carbon atoms or cycloaliphatic radicals of five to seven carbon atoms in the ring. The aliphatic radicals may bear for example phenyl, hydroxy or dialkylamino groups as additional substituents.

Preferred alkylamino groups include n-propylamino, isobutylamino and β-phenylethylamino as well as ethylamino, isopropylamino, propenylamino, cyclohexylamino, β-hydroxyethylamino and benzylamino.

Among the dialkylamino compounds linear or branched, saturated or unsaturated alkyls of one to six carbon atoms are particularly suitable or those with X derived from a secondary cyclic amine having five to seven ring members.

Preferred dialkylamino radicals are dimethylamino, diethylamino, methylmethylpropargylamino, hexamethylenimino, morpholino and N-methylpiperazino.

In addition to their effect on the heart and circulation, compounds in which R is methyl have a antimarked-inflammatory activity.

X in these compounds is preferably hexamethylenimino, dimethylamino or N-methylpiperazino.

The following Exampes A to D describe the production of starting compound of the Formulae 2 to 6, the remaining examples concerning compounds according to the invention.

EXAMPLE A 6-(p-chloroacetylamino)-phenyl-4,5-dihydropyridazone-(3)

94.5 g. (0.5 mole) of 6-p-aminophenyl - 4,5 - dihydropyridazone-(3) is boiled under reflux for two hours with 56.5 g. (0.5 mole) of chloroacetyl chloride and 500 ml. of absolute benzene. Suction filtration is carried out at 10° C. and the product is washed with benzene and dried at 100° C. in vacuo. The compound contains 1 mole of HCl added on to it. The adduct decomposes into hydrochloric acid and the free compound when it is washed with water.

Yield (HCl adduct): 147 g. (97% of theory)
Melting point after recrystallization from water, dimethylformamide (free compound): 233° C.

EXAMPLE B 6-p-(α-chloropropionylamino)-phenyl-4,5-dihydropyridazone-(3)

47.25 g. (0.25 mole) of 6-p-aminophenyl-4,5-dihydropyridazone-(3), 35.6 g. (0.28 mole) of α-chloropropionyl chloride and 250 ml. of absolute benzene are boiled under reflux for two hours. The product is suction filtered, washed with benzene and then with water and dried in vacuo at 100° C.

Yield: 64.8 g. (93% of theory),
Melting point after recrystallization from propanol: 243° to 244° C.

EXAMPLE C 6-(p-chloroacetylamino)-phenyl-4,5-dihydropyridazone-(3)

27.0 g. (0.1 mole) of β-(p-chloroacetylaminobenzoyl)-propionic acid is boiled under reflux with 5.5 g. (0.11 mole) of hydrazine hydrate in 30 ml. of n-propanol for two hours. The product is suction filtered, washed and dried at 80° C. in vacuo.

Yield: 25.0 g. (96% of theory).

EXAMPLE D

β-(p-chloroacetylaminobenzoyl)-propionic acid 96.5 g. (0.5 mole) of β-(p-aminobenzoyl)-propionic acid is boiled under reflux for two hours with 62.2 g. (0.55 mole) of chloroacetyl chloride in 1 liter of absolute benzene. The product is suction filtered, washed with benzene and dried at 80° C. in vacuo.

Yield: 130 g. (96% of theory).
Melting point: 183° to 184.5° C.

EXAMPLE 1

6-p-(n-propylaminoacetylamino) - phenyl - 4,5 -dihydropyridazone-(3)

26.55 g. (0.1 mole) of 6-p-(chloroacetylamino)-phenyl-4,5-dihydropyridazone(3) is boiled under reflux for two hours with 29.5 g. (0.5 mole) of h-propylamine and 150 ml. of ethanol. The reaction product is suction filtered at 0° C., washed with cold ethanol and dried at 70° C. in vacuo.

Yield: 20.5 g. (71% of theory)
Melting point after recrystallization from ethanol: 153° to 155° C.

EXAMPLE 2

6-p-(m-trifluoromethylanilinoacetylamino) - phenyl - 4,5-dihydropyridazone-(3)

18.55 g. (0.07 mole) of 6-p-(chloroacetylamino)-phenyl-4,5-dihydropyridazone-(3) is boiled under reflux with 33.8 g. (0.21 mole) of m-trifluoromethylaniline and 150 ml. of n-propanol for twenty hours. The product is suction filtered at 0° C. washed with cold ethanol and dried at 100° C. in vacuo.

Yield: 18.4 g. (67% of theory)
Melting point after recrystallization from ethanol: 172° to 174° C.

EXAMPLE 3

6 - p - (trimethylammoniumacetylamino) - phenyl - 4,5 - dihydropyridazone-(3)-chloride 18.1 g. (0.06 mole) of 6-p-(chloroacetylamino)-phenyl-4,5-dihydropyridazone-(3) hydrochloride is boiled under reflux with 44.25 g. (0.3 mole) of 40% aqueous trimethylamine solution and 100 ml. of ethanol for two hours. Suction filtration is carried out at 0° C. and the product is washed with cold ethanol and dried in vacuo at 70° C.

Yield: 17.9 g. (92% of theory)
Melting point after recrystallization from a mixture of water and ethanol: 277° C.

EXAMPLE 4

6-p-(α-hexamethyleniminopropionylamino) - phenyl - 4,5-dihydropyridazone-(3)

11.2 g. (0.04 mole) of 6-p-(α-chloropropionylamino)-phenyl-4,5-dihydropyridazone-(3) is boiled under reflux with 21.8 g. (0.22 mole) of hexamethylenimine and 110 ml. of ethanol for fifteen hours. The product is suction filtered, washed with cold ethanol and dried at 100° C. in vacuo.

Yield: 11 g. (80% of theory)
Melting point after recrystallization from ethyl acetate: 168° to 171° C.

EXAMPLE 5

6 - (p - isopropylaminoacetylamino) - phenyl - 4,5 - di - hydropyridazone-(3)

5.4 g. (0.02 mole) of β-(p-chloroacetylaminobenzoyl)-propionic acid is boiled under reflux with 4.7 g. (0.08 mole) of isopropylamine in 50 ml. of water for two hours. 1.1 g. (0.022 mole) of hydrazine hydrate is added and the whole is boiled under reflux for another six hours. The precipitate is suction filtered, washed with water and dried at 80° C. in vacuo.

Yield: 4.2 g. (74% of theory)
Melting point: 154° to 167° C.

EXAMPLE 6

6 - (p - butylaminoacetylamino) - phenyl - 4,5 - dihydropyridazone-(3)

5.4 g. (0.02 mole) of β-(p-chloroacetylamino-benzoyl)-propionic acid is boiled under reflux for two hours with 5.8 g. (0.08 mole) of n-butylamine in 50 ml. of water. 1.1 g. (0.022 mole) of hydrazine hydrate is then added and the whole is boiled under reflux for another six hours. The precipitate is suction filtered, washed with water and dried at 80° C. in vacuo.

Yield: 4.9 g. (81% of theory)
Melting point: 136° to 138° C.

EXAMPLE 7

6 - (p - morpholinoacetylamino) - phenyl - 4,5 - dihydropyridazone-(3)

5.4 g. (0.02 mole) of β-(p-chloroacetylaminobenzoyl)-propionic acid is boiled under reflux for two hours with 6.9 g. (0.08 mole) of morpholine in 50 ml. of water. 1.1 g. (0.22 mole) of hydrazine hydrate is added and the whole is boiled under reflux for another six hours. The precipitate is suction filtered, washed with water and dried at 80° C. in vacuo.

Yield: 6.2 g. (98% of theory)
Melting point: 187° to 189° C.

EXAMPLE 8

6 - (p - dimethylaminoacetylamino) - phenyl - 4,5 - di - hydropyridazone-(3)

5.4 g. (0.02 mole) of β-(p-chloroacetylaminobenzoyl)-propionic acid is boiled under reflux with 9 g. (0.08 mole) of 40% dimethylamine solution in 50 ml. of water for two hours. Then 1.1 g. (0.022 mole) of hydrazine hydrate is added and the whole is boiled under reflux for another six hours. The precipitate is suction filtered, washed with water and dried at 80° C. in vacuo.

Yield: 3.7 g. (67% of theory). Melting point: 206° to 208° C.

The dihydropyridazones described in the following table (Examples 9 to 32) are obtained by the same methods as described in Examples 1 to 4 and in Examples 5 to 8.

EXAMPLE 1

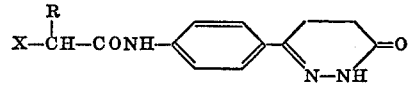

| Example | X | R | Yield in percent of theory | Melting point, ° C. |
| --- | --- | --- | --- | --- |
| 9 | $CH_3CH_2NH-$ | H | 80 | (Hydrochloride) 279–81 (ethanolwater). |
| 10 | $(CH_3)_2CH-NH-$ | H | 70 | 168–171 (ethanol). |
| 11 | $\begin{array}{c}CH_3\\|\\C_2H_5-CH-NH-\end{array}$ | H | 80 | 151–152 (ethanol). |
| 12 | ⌬-NH | H | 94 | 183–184 (ethanol). |
| 13 | $CH_2=CHCH_2NH-$ | H | 60 | 132–135 (ethanol). |
| 14 | $\begin{array}{c}CH_3\\|\\HC\equiv C-CH-NH-\end{array}$ | H | 67 | 173–176 (ethanol). |
| 15 | $HOCH_2CH_2HN-$ | H | 73 | 174–177 (water). |
| 16 | $(CH_3)_2N(CH_2)_3NH$ | H | 58 | (Hydrochloride) 242–244 (methanol). |
| 17 | ⌬-$CH_2NH-$ | H | 77 | 156–157 (ethanol). |
| 18 | ⌬-$CH_2CH_2NH-$ | H | 91 | 139–146 (methanol). |

TABLE—Continued

| Example | X | R | Yield in percent of theory | Melting point, °C. |
|---|---|---|---|---|
| 19 | F—⟨phenyl⟩—NH— | H | 81 | 180–182 (ethanol). |
| 20 | 2,6-dimethylphenyl—NH— | H | 75 | 218–219 (methanol). |
| 21 | (CH₃)₂N— | H | 82 | 203–204 (ethanol). |
| 22 | (C₂H₅)₂N— | H | 89 | 212–213 (ethyl acetate). |
| 23 | HC≡C—CH(CH₃)—N(CH₃)— | H | 65 | 196–199 (ethanol). |
| 24 | pyrrolidino | H | 80 | 196–197 (ethanol). |
| 25 | morpholino | H | 96 | 198–199 (ethanol). |
| 26 | 4-methylpiperazino | H | 86 | 243–247 (ethanol). |
| 27 | piperidino | H | 81 | 201–203 (ethyl acetate). |
| 28 | (CH₃)₂N— | CH₃ | 55 | 179–182 (ethanol). |
| 29 | 4-methylpiperazino | CH₃ | 89 | 235–237 (ethanol). |
| 30 | 2-methyl-4-methoxyphenyl—N— | H | 92 | 211–212 (propanol). |
| 31 | N,N-dimethylpyrrolidinium chloride | H | 95 | 261–262 (ethanol). |
| 32 | N-methylmorpholinium chloride | H | 70 | 240 (methanol). |

We claim:
1. A 6-acylamino-4,5-dihydropyridazone of the formula

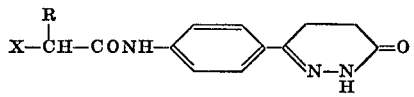

or a physiologically compatible acid addition salt thereon in which:
R is hydrogen or methyl; and
X is alkylamino of 1 to 6 carbon atoms or said alkylamino bearing one phenyl on the alkyl portion thereof.

2. A dihydropyridazone as claimed in claim 1 wherein X is alkylamino of 1 to 4 carbon atoms or said phenyl-substituted alkylamino of 1 to 3 carbon atoms in the alkyl portion thereof.

3. 6-p-(2-butylaminoacetylamino)-phenyl-4,5-dihydropyridazone-(3).

4. 6-p-(β - phenylethylaminoacetylamino) - phenyl-4,5-dihydropyridazone-(3).

5. 6 - p - (n-propylaminoacetylamino) - phenyl - 4,5 - dihydropyridazone-(3).

6. 6 - p - (isobutylaminoacetylamino) - phenyl - 4,5 - dihydropyridazone-(3).

References Cited
UNITED STATES PATENTS
3,475,431  10/1969  Bachmann _____ 260—250 A FOREIGN PATENTS
1,507,475  12/1967  France _____260—250 A

OTHER REFERENCES

Burger: Medicinal Chemistry, 3rd Ed., part II, Wiley and Sons, Interscience, Chapter 55.

DONALD G. DAUS, Primary Examiner
R. McCLOUD, Assistant Examiner

U.S. Cl. X.R.
260—247.2 A, 268 H, 518 A, 518 R, 471 R; 424—250, 248

UNITED STATES PATENT OFFICE
CERTIFICATE OF CORRECTION

PATENT NO. : 3,806,509
DATED : April 23, 1974
INVENTOR(S) : Rolf Lebkuecher et al.

It is certified that error appears in the above-identified patent and that said Letters Patent are hereby corrected as shown below:

In Column 3, Line 62, delete "antimarked-inflammatory activity" and substitute -- marked anti-inflammatory activity.--

In Column 6, Example 15, under the column "X", delete "HOCH$_2$CH$_2$HN" and substitute --HOCH$_2$CH$_2$NH--

In Column 6, Example 9, under the column "Melting point, °C.", delete "(Hydrochloride) 279--81 (ethanolwater)" and substitute -- (Hydrochloride) 279-281 (ethanol/water) --

Signed and Sealed this twenty-second Day of June 1976

[SEAL]

Attest:

RUTH C. MASON
Attesting Officer

C. MARSHALL DANN
Commissioner of Patents and Trademarks